United States Patent
Roberts, III et al.

(10) Patent No.: US 9,895,716 B2
(45) Date of Patent: Feb. 20, 2018

(54) REPAIR PROCESS AND A REPAIRED COMPONENT

(71) Applicant: GENERAL ELECTRIC COMPANY, Schenectady, NY (US)

(72) Inventors: Herbert Chidsey Roberts, III, Simpsonville, SC (US); Stanley F. Simpson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 641 days.

(21) Appl. No.: 13/864,576

(22) Filed: Apr. 17, 2013

(65) Prior Publication Data

US 2014/0315029 A1 Oct. 23, 2014

(51) Int. Cl.
*B05D 5/00* (2006.01)
*B29C 73/02* (2006.01)
(Continued)

(52) U.S. Cl.
CPC .............. *B05D 5/005* (2013.01); *B29C 73/02* (2013.01); *B29C 2035/0827* (2013.01);
(Continued)

(58) Field of Classification Search
CPC ........ Y10T 29/49316; Y10T 29/49318; B05D 5/005; B29C 73/02; B29C 2073/262;
(Continued)

(56) References Cited

U.S. PATENT DOCUMENTS 2,686,654 A * 8/1954 Roush ........................... 428/551
4,133,731 A 1/1979 Hansen et al.
(Continued)

FOREIGN PATENT DOCUMENTS

CN 1857847 A 11/2006
CN 101733610 A 6/2010
(Continued)

OTHER PUBLICATIONS

European Search Report and Written Opinion issued in connection with corresponding EP Application No. 14164645.5-1706 dated Sep. 11, 2014.
(Continued)

*Primary Examiner* — Richard Chang
(74) *Attorney, Agent, or Firm* — McNees Wallace & Nurick LLC

(57) ABSTRACT

Matrix composite component repair processes are disclosed. The matrix composite repair process includes applying a repair material to a matrix composite component, securing the repair material to the matrix composite component with an external securing mechanism and curing the repair material to bond the repair material to the matrix composite component during the securing by the external securing mechanism. The matrix composite component is selected from the group consisting of a ceramic matrix composite, a polymer matrix composite, and a metal matrix composite. In another embodiment, the repair process includes applying a partially-cured repair material to a matrix composite component, and curing the repair material to bond the repair material to the matrix composite component, an external securing mechanism securing the repair material throughout a curing period, In another embodiment, the external securing mechanism is consumed or decomposed during the repair process.

22 Claims, 6 Drawing Sheets

(51) Int. Cl.
   *B29C 35/08*   (2006.01)
   *B29C 73/26*   (2006.01)

(52) U.S. Cl.
   CPC ............ *B29C 2035/0844* (2013.01); *B29C 2035/0861* (2013.01); *B29C 2035/0877* (2013.01); *B29C 2073/262* (2013.01); *Y10T 428/31504* (2015.04); *Y10T 428/31678* (2015.04)

(58) Field of Classification Search
   CPC .... B29C 2035/0844; B29C 2035/0861; B29C 2035/0877; B29C 2035/0827
   See application file for complete search history.

(56) References Cited

U.S. PATENT DOCUMENTS

| | | | |
|---|---|---|---|
| 5,199,631 A | | 4/1993 | Anderson et al. |
| 5,200,438 A | | 4/1993 | Fujii et al. |
| 5,732,467 A | * | 3/1998 | White et al. ............... 29/889.1 |
| 5,747,551 A | | 5/1998 | Lewandowski et al. |
| 5,928,448 A | * | 7/1999 | Daws .................. B23P 6/00 156/92 |
| 6,149,749 A | * | 11/2000 | McBroom ............ B29C 73/02 156/87 |
| 6,820,334 B2 | * | 11/2004 | Kebbede .............. B23P 6/005 29/889.1 |
| 6,884,843 B2 | | 4/2005 | Kauffman et al. |
| 7,442,444 B2 | | 10/2008 | Hazel et al. |
| 7,509,735 B2 | * | 3/2009 | Philip et al. ............... 29/889.1 |
| 8,025,499 B2 | | 9/2011 | Hubert et al. |
| 2003/0203210 A1 | | 10/2003 | Graff et al. |
| 2005/0235493 A1 | | 10/2005 | Philip et al. |
| 2006/0248718 A1 | | 11/2006 | Szela et al. |
| 2010/0126014 A1 | | 5/2010 | Gupta et al. |

FOREIGN PATENT DOCUMENTS

| | | |
|---|---|---|
| EP | 2517865 A1 | 10/2012 |
| WO | 9209433 A1 | 6/1992 |

OTHER PUBLICATIONS

Dastin, "Repairing Advanced Composite Materials", Machine Design, vol. No. 58, Issue No. 4, pp. 86-90, Feb. 1, 1986.
Baker et al., "Repair Techniques for Composite Structures", Composite Materials in Aircraft Structures, pp. 207-227, Jan. 1, 1990.
Border, "The Heat's on for Quick Composite Repair", Machine Design, vol. No. 63, Issue No. 5, pp. 71-74, Mar. 7, 1991.
Hexcel Composites, "Composite Repair", Internet Citation, Apr. 1999.
Campbell, "Bonded repairs" In: "Bonded repairs", pp. 501-511, Jan. 1, 2004.
Unofficial English Translation of First Office Action and Search issued in connection with corresponding CN Application No. 201410154489.8 dated Jun. 28, 2016.

* cited by examiner

REPAIR PROCESS AND A REPAIRED COMPONENT

GOVERNMENT LICENSE RIGHTS

This invention was made with government support under contract number DE-FC26-05NT42643 awarded by the Department of Energy. The government may have certain rights in the invention.

FIELD OF THE INVENTION

The present invention is directed to a repair process and a repaired component. More specifically, the present invention is directed to a matrix composite repair process and a repaired matrix composite component.

BACKGROUND OF THE INVENTION

Gas turbines are continuously being exposed to harsher conditions including higher temperature and pressure, in order to improve efficiency. The higher temperatures and pressures may have deleterious effects on gas turbine components, such as creep damage, fatigue and cracking. This damage can require repair or replacement of the component, which is both costly and time consuming.

Repair and replacement of components often results in significant operational delays, lost production, and reduced overall operational efficiency. When a component, such as a turbine blade, is damaged, the turbine can be shut down and the blade is removed for repair. In addition to the time required to remove a damaged blade and re-install a repaired blade, the entire turbine can be in-operational during repair.

One method of repair includes removing the damaged component, locally blending the damage site and undergoing a heat treatment based repair process. This is time consuming and results in significant lost productivity. An attempt to return a turbine to operational condition without heat treatment involves removing the damaged component, excising a damaged portion and returning the component with an exposed area to the device. The device having the component with the exposed area operates at a reduced or diminished capacity.

A repair process not suffering from the above drawbacks would be desirable in the art.

BRIEF DESCRIPTION OF THE INVENTION

In an exemplary embodiment, a repair process includes applying a repair material to a matrix composite component, securing the repair material to the matrix composite component with an external securing mechanism, and curing the repair material to bond the repair material to the matrix composite component during the securing by the external securing mechanism. The matrix composite component is selected from the group consisting of a ceramic matrix composite, a polymer matrix composite, and a metal matrix composite.

In another exemplary embodiment, a repair process includes applying a partially-cured repair material to a matrix composite component, securing the repair material to the matrix composite component with an external securing mechanism, the external securing mechanism securing the repair material throughout a curing period, and curing the repair material to bond the repair material to the matrix composite component. The matrix composite component is selected from the group consisting of a ceramic matrix composite, a polymer matrix composite, and a metal matrix composite.

In another exemplary embodiment, a repair process includes applying an uncured repair material to a matrix composite component, temporarily securing the repair material to the matrix composite component with an external securing mechanism, and consuming or decomposing the external securing mechanism. The composite matrix component is selected from the group consisting of a ceramic matrix composite, a polymer matrix composite, and a metal matrix composite.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary process of repairing a matrix composite component. Embodiments of the present disclosure, in comparison to processes not utilizing one or more features disclosed herein, decrease repair time, decrease repair costs, decrease device down time, increase device capacity following component damage, increase repair efficiency, or combinations thereof.

Figure 1:
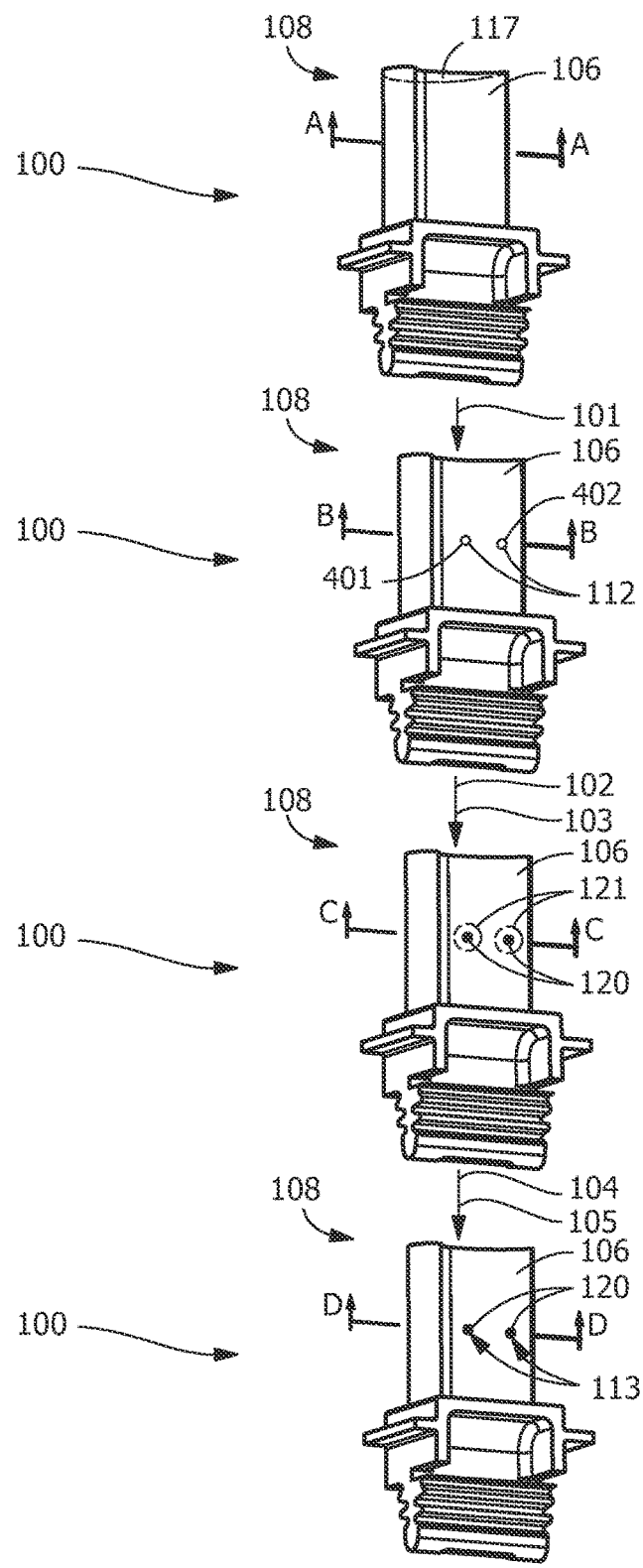
FIG. 1 shows a repair process according to an embodiment of the disclosure.
Figure 2:
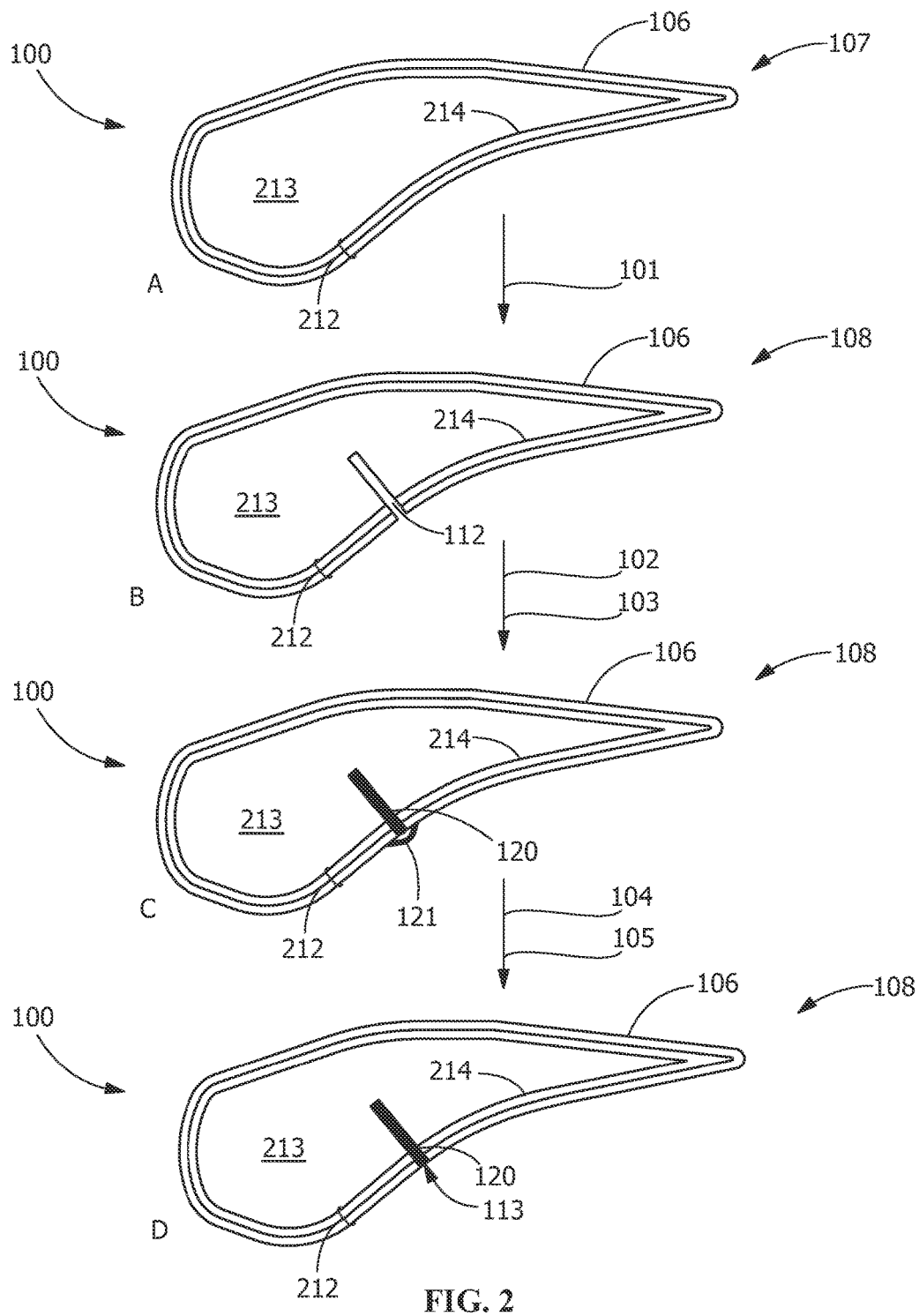
FIG. 2 shows cross-sectional views corresponding to the repair process of FIG. 1.
Figure 3:
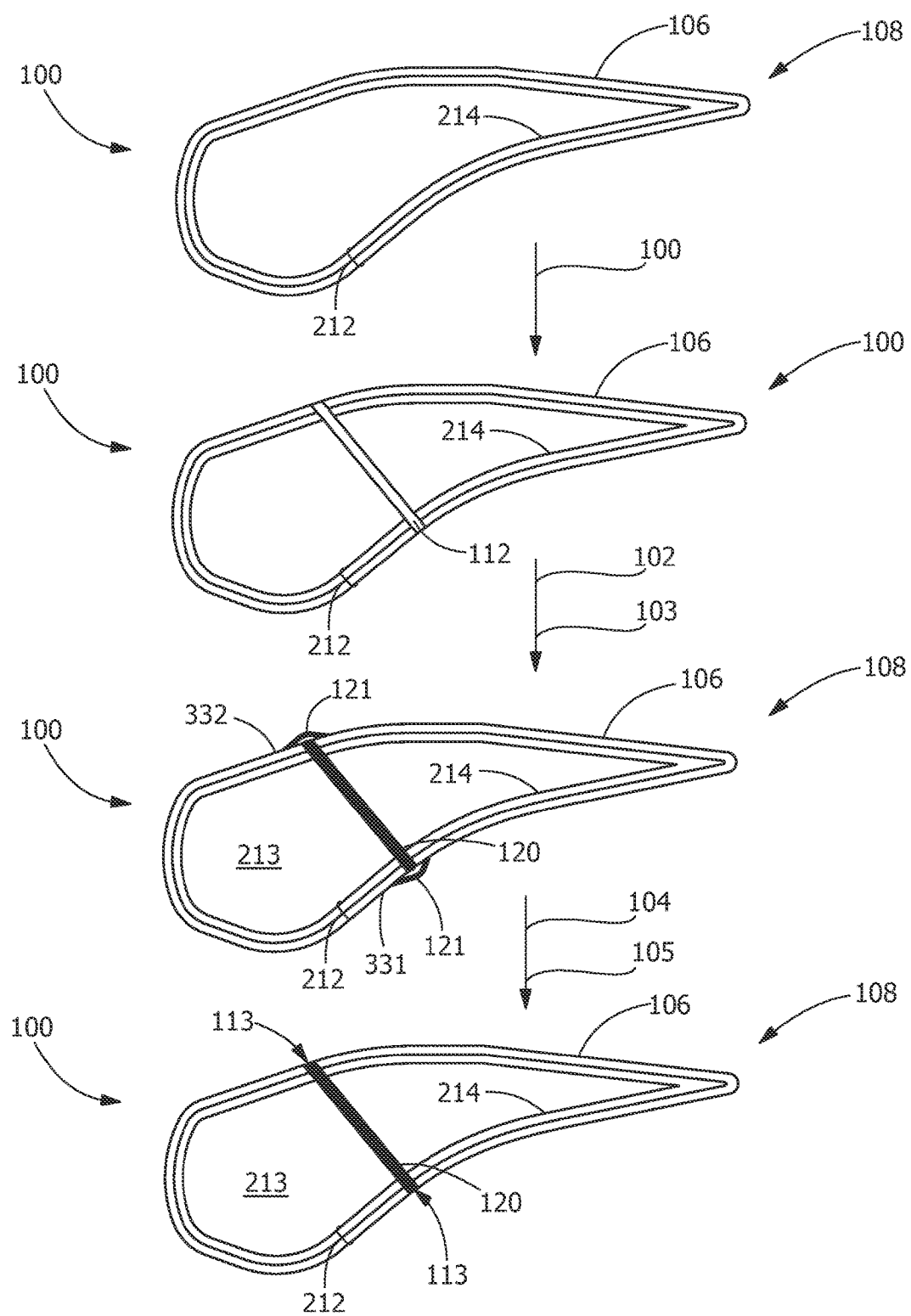
FIG. 3 shows cross-sectional views of a repair process according to an embodiment of the disclosure.

A matrix composite is selected from the group consisting of, but not limited to, a ceramic matrix composite (CMC), a polymer matrix composite (PMC), a metal matrix composite (MMC), or a combination thereof. Referring to FIG. 1 and FIG. 2, in one embodiment, a matrix composite component 100, such as a turbine blade (or bucket) 108 is undamaged, as is shown in section step A of FIG. 2. In FIG. 2 and FIG. 3, step A shows FIG. 1 taken in direction A-A, step B shows FIG. 1 taken in direction B-B, step C shows FIG. 1 taken in direction C-C and step D shows FIG. 1 taken in direction D-D. In other embodiments, the matrix composite component 100 is or includes a sheet, a nozzle, a combustor liner, a vane, a shroud, a flow path frame, a flap, a seal, a turbo-machinery component or a combination thereof. The undamaged turbine blade 108 has a coating layer 212 that is continuous and fully intact. The coating layer 212 includes, but is not limited to, a thermal barrier coating, an environmental barrier coating (EBC), matrix composite material, silicon carbide, or a combination thereof. A body portion 213 of the turbine blade 108 includes or is defined by a matrix composite material. The body portion 213 is coated or defined at a body edge 214 by one or a plurality of layers. A distal layer from the body edge 214 forms an outer face 106.

In one embodiment, the matrix composite component 100 is damaged (step 101) from, for example, operational wear and tear, foreign object contact, external surface contact, age, manufacturing, or a combination thereof. A damaged portion 112 of the matrix composite component 100 is visible on the outer face 106 of the matrix composite component 100, as is shown in step B of FIG. 2. In one embodiment, the damaged portion 112 extends through the coating layer 212 and partially into the body portion 213.

Following the matrix composite component 100 being damaged (step 101), the damaged portion 112 is filled with a repair material 120 (step 102). Suitable repair materials include, but are not limited to, EBC, CMC, PMC, and MMC materials with matched coefficients of thermal expansion, or a combination thereof. The repair material 120 is applied uncured, partially-cured, cured, or a combination thereof. The repair material 120 is applied to the matrix composite component 100 with a media transfer device, a syringe, a spray, or a combination thereof. In one embodiment, the repair material 120 protrudes from the outer face 106 of the matrix composite component 100.

An external securing mechanism 121 is applied over the repair material 120 (step 103). As shown in FIG. 2 and FIG. 3, a gap may be formed between the repair material 120 and the external securing mechanism 121. In one embodiment, the external securing mechanism 121 is permeable to heat and/or other radiation sources, impermeable or substantially impermeable to the repair material 120, and retains the repair material 120 in the damaged portion 112. Suitable external securing mechanisms 121 include, but are not limited to, silicone, epoxy, polymer, organic bonding patch, and combinations thereof. In one embodiment, the external securing mechanism 121 covers the repair material 120 and temporarily or permanently adheres to the matrix composite component 100. As used herein, the term "temporarily" refers to a pre-determined period. For example, in one embodiment, the external securing mechanism 121 adheres to the matrix composite component 100 until being consumed or decomposed through operation or removed. In one embodiment, if the external securing mechanism 121 is never destroyed or removed, the external securing mechanism 121 adheres to the matrix composite component 100 throughout the operational life of the matrix composite component 100.

In one embodiment, the external securing mechanism 121 is adhesively coupled to the matrix composite component 100 and secures the repair material 120 to the matrix composite component 100. The external securing mechanism 121 is not part of the matrix composite component 100 or the repair material 120. In another embodiment, the external securing mechanism 121 is resistant to spinning off of the matrix composite component 100. For example, in one embodiment the matrix composite component 100 is the turbine blade 108, and as a gas turbine rotates the turbine blade 108, the external securing mechanism 121 adheres.

The matrix composite component 100, including the repair material 120 and external securing mechanism 121 shown in step C of FIG. 2, is heated (step 104). In one embodiment, the heat destroys the external securing mechanism 121 and/or cures the repair material 120 to the damaged portion 112. In one embodiment, the repair material 120 is cured through ultraviolet (UV) radiation or electron beam (EB) radiation. In one embodiment, the heat is generated by operation of the gas turbine. In one embodiment, the destruction of the external securing mechanism 121 exposes a cured protrusion 122 of the repair material 120 protruding from the outer face 106. The cured protrusion 122 of the repair material 120 is machined (step 105) to form a flush surface 113 between the repair material 120 and the outer face 106, as is shown in step D of FIG. 2.

In one embodiment, the matrix composite component 100 is undamaged, as is shown in step A of FIG. 3. The damaged portion 112 extends throughout the body portion 213 and the coating layer 212, as is shown in step B of FIG. 3. The damaged portion 112 is filled with the repair material 120 (step 102), which protrudes from the outer surface 106 on a first side 331 and a second side 332, for example, opposing the first side 331. The external securing mechanism 121 is applied over the repair material 120 (step 103) on the first side 331 and the second side 332, adhering to the outer surface 106 of the turbine blade 108, as is shown in step C of FIG. 3. The turbine blade 108 is heated (step 104), and in one embodiment, the heat consumes or decomposes the external securing mechanism 121 on the first side 331 and the second side 332, at the same time curing the repair material 120 to the turbine blade 108. In a further embodiment, as is shown in step D of FIG. 3, the first side 331 and the second side 332 are machined (step 105) to form a flush surface 113 between the repair material 120 and the outer face 106.

Figure 4:
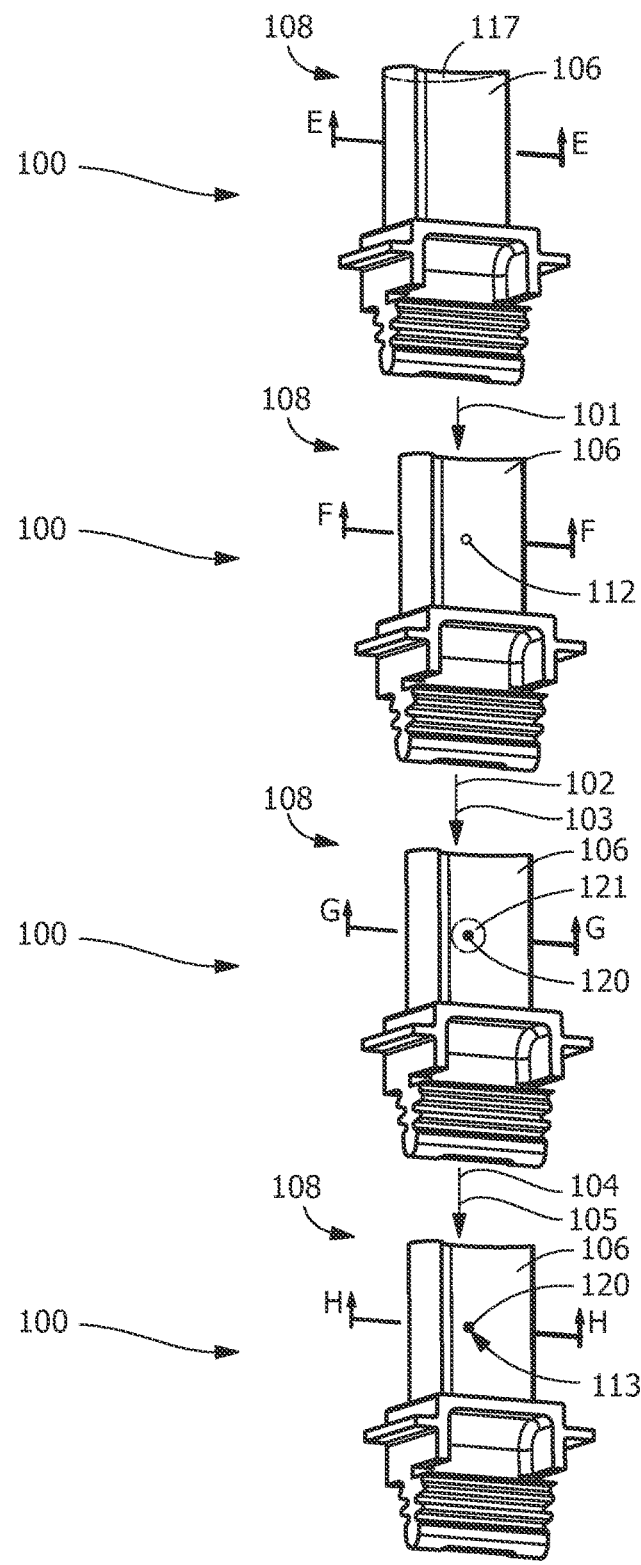
FIG. 4 shows a repair process according to an embodiment of the disclosure.
Figure 5:
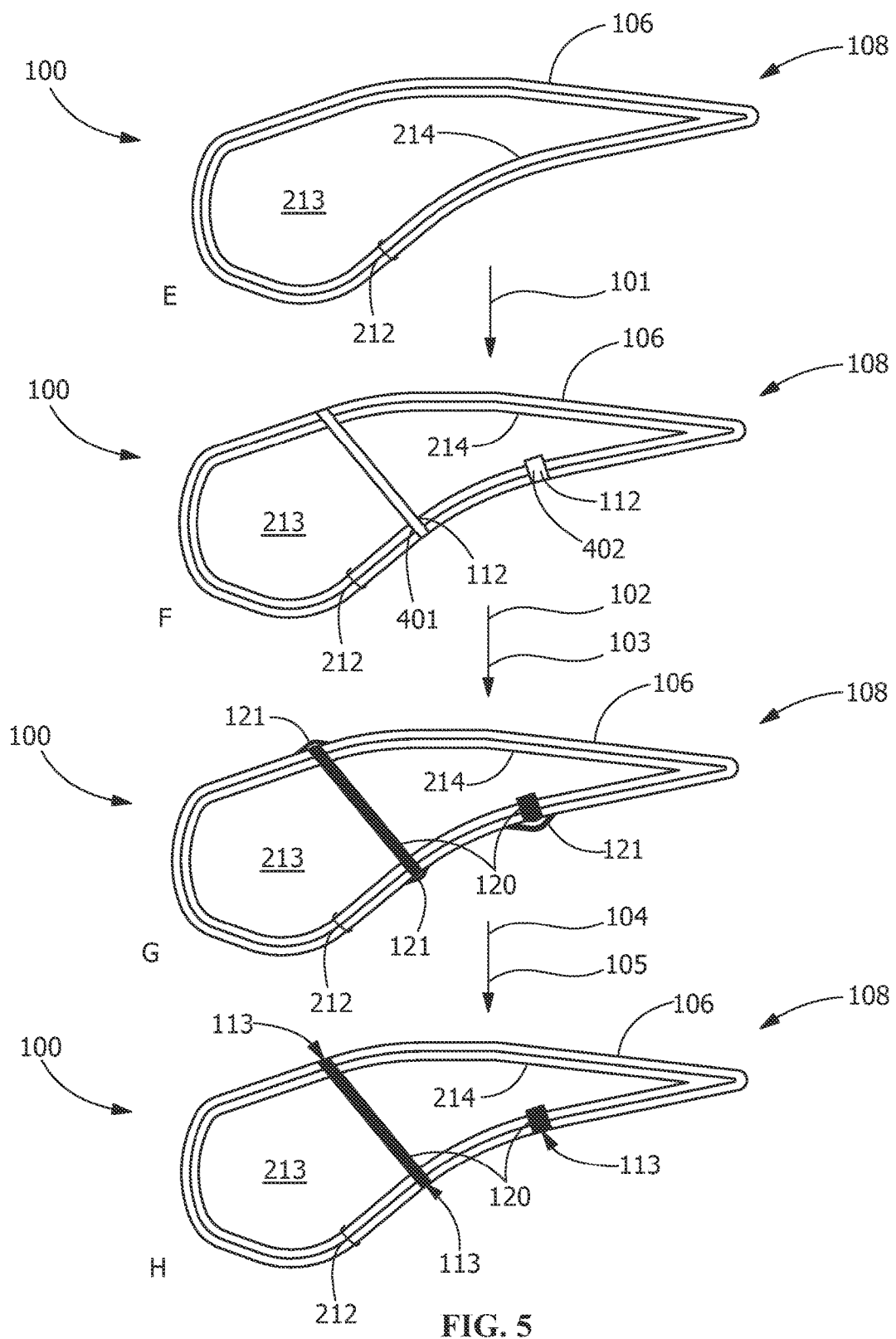
FIG. 5 shows cross-sectional views corresponding to the repair process of FIG. 4.

Referring to FIGS. 4 and 5, in one embodiment, multiple damaged portions 112 are formed (step 101) in the body portion 213 of the matrix composite component 100. For example, in one embodiment, the damaged portions 112 are a fully penetrated hole 401, and a partially penetrated hole 402, as is shown in step B of FIG. 5. In FIG. 5, step A shows FIG. 4 taken in direction A-A, step B shows FIG. 4 taken in direction B-B, step C shows FIG. 4 taken in direction C-C and step D shows FIG. 4 taken in direction D-D. The damaged portions 112 include, but are not limited to, the fully penetrated hole 401, the partially penetrated hole 402, pit damage 601 (see FIG. 6), a fully penetrated crack, a partially penetrated crack, a broken off portion, or a combination thereof. The damaged portions 112 are filled with repair material 120 (step 102). The repair material 120 is covered by the external securing mechanism 121 (step 103), which is adhered to the outer face 106 of the matrix composite component 100, as is shown in step C of FIG. 5, such as the turbine blade 108.

In one embodiment, a first region corresponds to a non-repaired material of the matrix composite component 100 and a second region corresponds to the repair material 120. The non-repaired material of the matrix composite component 100 has a first microstructure and the repair material 120 has a second microstructure. The second microstructure of the repair material 120 differs from the first microstructure of the non-repaired material of the matrix composite component 100. In one embodiment, the second microstructure appears discolored against the first microstructure on the flush surface 113 of the machined matrix composite component 100. Re-applying a coating, such as, but not limited to the EBC, the TBC, or a combination thereof, defines the outer face 106 as a singular medium. The re-applied coating on the matrix composite component 100 appears undamaged.

Figure 6:
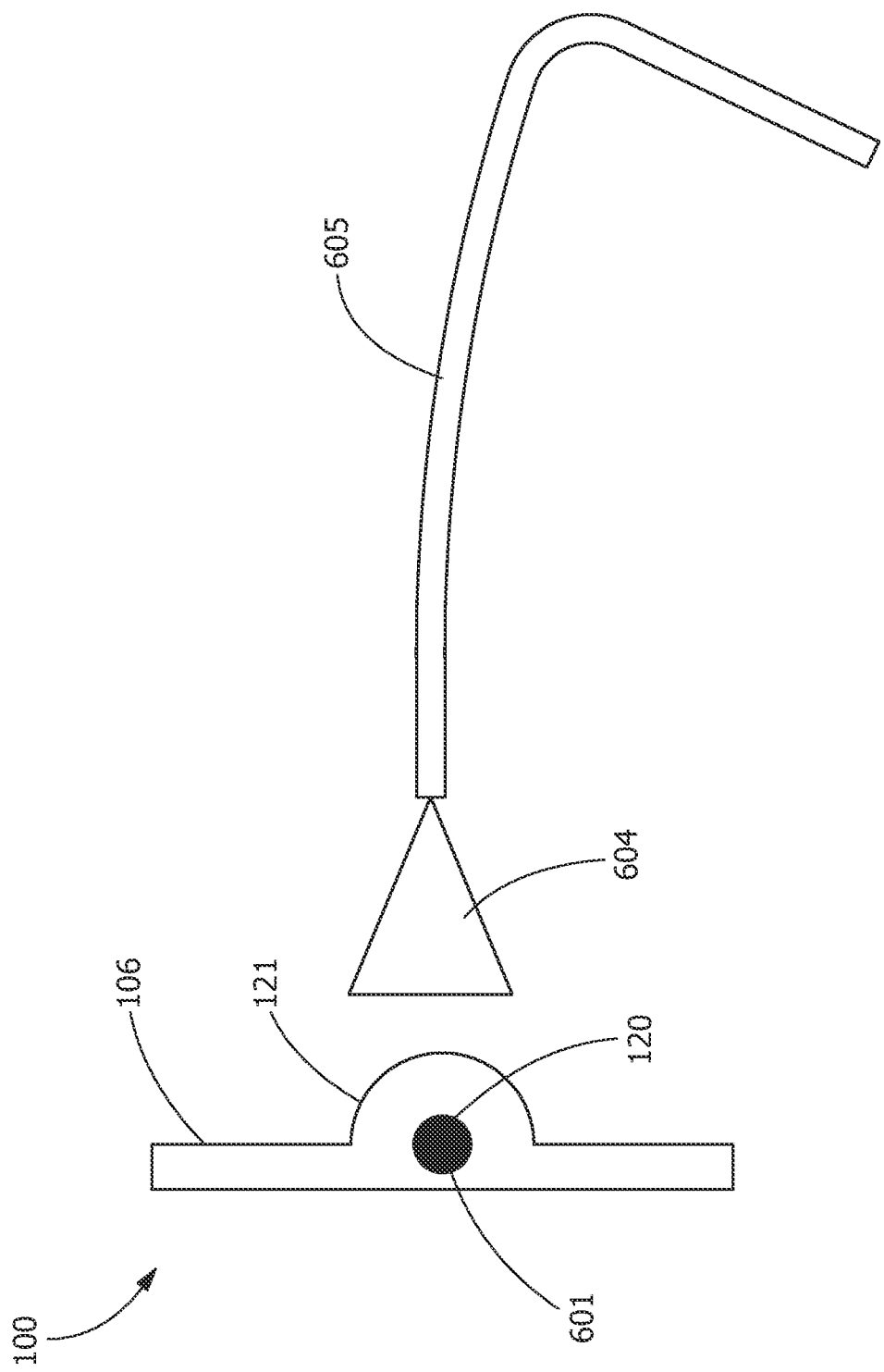
FIG. 6 is a side view of a curing system capable of performing an embodiment of the repair process according to the disclosure.

Referring to FIG. 6, in one embodiment, the matrix composite component 100 has the pit damage 601 on the outer face 106. The pit damage 601 is filled with the repair material 120. In one embodiment, a bond material is intermixed with the repair material 120. In one embodiment, the bond material is applied over the repair material 120. In one embodiment, a rapid curing of the external securing mechanism 121 is achieved through use of a catalyst 604. The catalyst 604 is any suitable bonding agent activation item, such as, but not limited to, UV radiation, EB radiation, radiofrequency (RF), x-ray, or a combination thereof.

In one embodiment, a flexible working tool 605 is provided to deliver the catalyst 604 to the external securing mechanism 121 while the matrix composite component 100 remains secured to a system, such as the gas turbine. In one embodiment, the external securing mechanism 121 is rapidly cured over the repair material 120. The cured external securing mechanism 121 forms a more rigid retaining portion than the uncured external securing mechanism 121.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A repair process, comprising:
   applying a repair material to a ceramic matrix composite component;
   securing the repair material to the ceramic matrix composite component by applying an external securing mechanism over the repair material externally of the repair material and on a top surface of the ceramic matrix composite component; and
   curing the repair material to bond the repair material to the ceramic matrix composite component during the securing by the external securing mechanism.

2. The repair process of claim 1, wherein the external securing mechanism is impermeable to the repair material.

3. The repair process of claim 1, wherein the external securing mechanism includes a silicone.

4. The repair process of claim 1, wherein the external securing mechanism includes an epoxy.

5. The repair process of claim 1, wherein the external securing mechanism includes a polymer.

6. The repair process of claim 1, wherein the external securing mechanism includes an organic bonding patch.

7. The repair process of claim 1, wherein the external securing mechanism retains the repair material within a damaged portion of the ceramic matrix composite component.

8. The repair process of claim 1, wherein the applying of the repair material is by media transfer device.

9. The repair process of claim 1, wherein the applying of the repair material is by spraying.

10. The repair process of claim 1, wherein the securing of the repair material with the external securing mechanism is by applying adhesive coupling.

11. The repair process of claim 1, wherein the curing of the repair material is by applying heat.

12. The repair process of claim 1, wherein the curing of the repair material is by applying ultraviolet radiation.

13. The repair process of claim 1, wherein the curing of the repair material is by applying electron beam radiation.

14. The repair process of claim 1, wherein the ceramic matrix composite component is a rotating component of a gas turbine.

15. The repair process of claim 14, wherein the external securing mechanism is resistant to spinning off.

16. The repair process of claim 1, wherein the external securing mechanism is removable.

17. The repair process of claim 1, wherein the external securing mechanism is consumed or decomposed by heating during the curing process.

18. The repair process of claim 1, wherein the securing the repair material to the ceramic matrix composite component further comprises forming a gap between the repair material and the external securing mechanism.

19. A repair process, comprising:
   applying a partially-cured repair material to a ceramic matrix composite component;
   securing the repair material to the ceramic matrix composite component by applying an external securing mechanism over the partially-cured repair material externally of the repair material and on a top surface of the ceramic matrix composite component, the external securing mechanism securing the repair material throughout a curing period; and
   curing the repair material to bond the repair material to the ceramic matrix composite component.

20. The repair process of claim 19, wherein the securing the repair material to the ceramic matrix composite component further comprises forming a gap between the repair material and the external securing mechanism.

21. A repair process, comprising:
   applying an uncured repair material to a ceramic matrix composite component;
   temporarily securing the repair material to the ceramic matrix composite component by applying an external securing mechanism over the uncured repair material externally of the repair material and on a top surface of the ceramic matrix composite component; and
   heating to cure the repair material to the ceramic matrix composite component, and, at the same time, consume or decompose the external securing mechanism.

22. The repair process of claim 21, wherein the temporarily securing the repair material to the ceramic matrix composite component further comprises forming a gap between the repair material and the external securing mechanism.

* * * * *